United States Patent
Daniel et al.

(10) Patent No.: US 9,578,588 B2
(45) Date of Patent: Feb. 21, 2017

(54) APPARATUS, METHOD AND SYSTEM OF TETHERING BETWEEN A MOBILE DEVICE AND A NETWORK

(71) Applicant: INTEL IP CORPORATION, Santa Clara, CA (US)

(72) Inventors: Tomer Daniel, Herzliya (IL); Jonathan Segev, Tel Mond (IL)

(73) Assignee: INTEL IP CORPORATION, Santa Clara, CA (US)

( * ) Notice: Subject to any disclaimer, the term of this patent is extended or adjusted under 35 U.S.C. 154(b) by 123 days.

(21) Appl. No.: 14/227,273

(22) Filed: Mar. 27, 2014

(65) Prior Publication Data
US 2015/0282040 A1 Oct. 1, 2015

(51) Int. Cl.
*H04W 40/02* (2009.01)
*H04W 4/00* (2009.01)
*H04L 12/851* (2013.01)
*H04L 12/801* (2013.01)

(52) U.S. Cl.
CPC ............ *H04W 40/02* (2013.01); *H04W 4/008* (2013.01); *H04L 47/14* (2013.01); *H04L 47/24* (2013.01)

(58) Field of Classification Search
CPC ...... H04W 88/06; H04W 48/08; H04W 84/12; H04W 36/0022; H04W 36/38; H04W 36/385; H04W 92/02; H04W 40/02; H04W 40/22; H04W 28/12; H04L 45/22; H04L 45/24; H04L 45/125; H04L 47/122; H04L 47/14
See application file for complete search history.

(56) References Cited

U.S. PATENT DOCUMENTS

| 6,445,725 B1 * | 9/2002 | Sato ....................... H04B 1/707 348/32 |
| 6,747,972 B1 * | 6/2004 | Lenoski .................. H04L 45/00 370/394 |
| 8,213,306 B1 * | 7/2012 | Boch ..................... H04L 1/0084 370/230 |
| 8,848,579 B1 * | 9/2014 | Reeves ................. H04M 15/00 370/271 |

(Continued)

OTHER PUBLICATIONS

International Search Report and Written Opinion for International Patent Application No. PCT/US2015/017645, mailed on Jun. 8, 2015, 9 pages.

(Continued)

*Primary Examiner* — Dung B Huynh
(74) *Attorney, Agent, or Firm* — Shichrur & Co.

(57) ABSTRACT

Some demonstrative embodiments include devices, systems and methods of tethering between a mobile device and a network. For example, a first cellular device may include a tethering controller to control tethering between one or more mobile devices and a network server via a wireless local area network (WLAN) between the first cellular device and the mobile devices. The tethering controller may be configured to manage communication of traffic between the mobile devices and the network server via a distributed access path including a first path and at least one second path, the first path including a cellular network link between the first cellular device and the network server, and the second path including a non-cellular link between the first cellular device and a second cellular device.

23 Claims, 6 Drawing Sheets

(56) References Cited

U.S. PATENT DOCUMENTS

| | | | | |
|---|---|---|---|---|
| 2001/0007557 A1* | 7/2001 | Yamada | H04L 45/00 | 370/389 |
| 2003/0072269 A1* | 4/2003 | Teruhi | H04L 45/02 | 370/252 |
| 2003/0217178 A1* | 11/2003 | Yoshimura | H04L 29/06 | 709/239 |
| 2003/0223423 A1* | 12/2003 | Yu | H04L 45/7453 | 370/392 |
| 2004/0008707 A1* | 1/2004 | Nakamichi | H04L 45/04 | 370/401 |
| 2004/0063441 A1* | 4/2004 | Diao | G01S 5/02 | 455/456.1 |
| 2006/0165009 A1* | 7/2006 | Nguyen | H04L 12/2854 | 370/252 |
| 2006/0212597 A1* | 9/2006 | Shimada | H04L 67/1008 | 709/238 |
| 2009/0088192 A1* | 4/2009 | Davis | G08B 25/08 | 455/466 |
| 2009/0111471 A1* | 4/2009 | Li | H04W 36/14 | 455/437 |
| 2009/0141683 A1* | 6/2009 | Grinshpun | H04W 60/06 | 370/331 |
| 2009/0239543 A1* | 9/2009 | Kozu | H04W 76/041 | 455/445 |
| 2010/0121910 A1* | 5/2010 | Kim | H04L 45/00 | 709/203 |
| 2011/0028085 A1* | 2/2011 | Waung | H04W 88/04 | 455/7 |
| 2011/0028146 A1* | 2/2011 | Tammisetti | H04L 45/125 | 455/426.1 |
| 2011/0032914 A1* | 2/2011 | Venkateswaran | H04W 88/04 | 370/338 |
| 2011/0044336 A1* | 2/2011 | Umeshima | H04L 12/185 | 370/390 |
| 2011/0064407 A1* | 3/2011 | Gerstel | H04J 14/0221 | 398/45 |
| 2011/0070906 A1* | 3/2011 | Chami | H04L 45/22 | 455/507 |
| 2011/0081875 A1* | 4/2011 | Imamura | H04B 1/04 | 455/101 |
| 2011/0151864 A1* | 6/2011 | Byun | H04W 40/16 | 455/426.1 |
| 2011/0153863 A1* | 6/2011 | Khan | H04L 47/2416 | 709/235 |
| 2011/0211444 A1* | 9/2011 | Das | H04W 36/18 | 370/219 |
| 2011/0214166 A1* | 9/2011 | Vinayakray-Jani | H04L 63/061 | 726/5 |
| 2011/0306386 A1* | 12/2011 | Centoza | H04W 28/08 | 455/552.1 |
| 2012/0034922 A1* | 2/2012 | Jones | H04W 28/08 | 455/438 |
| 2012/0188873 A1* | 7/2012 | Nakatsugawa | H04L 1/0003 | 370/231 |
| 2012/0210142 A1* | 8/2012 | Ichiki | G06F 1/3209 | 713/300 |
| 2012/0240197 A1 | 9/2012 | Tran et al. | | |
| 2013/0130728 A1* | 5/2013 | Bendrum | H04W 4/14 | 455/466 |
| 2013/0254264 A1 | 9/2013 | Hankinson et al. | | |
| 2014/0002268 A1 | 1/2014 | Fong et al. | | |
| 2014/0003239 A1* | 1/2014 | Etemad | H04W 28/08 | 370/235 |
| 2014/0029527 A1* | 1/2014 | Okuda | H04W 72/085 | 370/329 |
| 2014/0078906 A1* | 3/2014 | Chen | H04L 69/18 | 370/237 |
| 2014/0133294 A1* | 5/2014 | Horn | H04W 28/0247 | 370/230 |
| 2014/0204834 A1* | 7/2014 | Singh | H04W 40/22 | 370/315 |
| 2014/0334446 A1* | 11/2014 | Lim | H04W 48/20 | 370/331 |
| 2014/0376473 A1* | 12/2014 | Leng | H04L 5/0053 | 370/329 |
| 2015/0012743 A1* | 1/2015 | Holtmanns | H04L 63/062 | 713/155 |
| 2015/0055622 A1* | 2/2015 | Roh | H04W 36/22 | 370/331 |
| 2015/0092553 A1* | 4/2015 | Sirotkin | H04W 28/08 | 370/235 |
| 2015/0098393 A1* | 4/2015 | Tofighbakhsh | H04W 24/02 | 370/329 |
| 2015/0120865 A1* | 4/2015 | Lee | H04W 36/02 | 709/217 |
| 2015/0163715 A1* | 6/2015 | Das | H04W 36/22 | 455/436 |
| 2015/0215839 A1* | 7/2015 | Johansson | H04W 36/30 | 455/426.1 |
| 2015/0242415 A1* | 8/2015 | Martini | G06F 17/30082 | 707/694 |
| 2016/0073294 A1* | 3/2016 | Wijting | H04W 28/08 | 370/237 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wireless Gigabit Alliance (WGA) Specifications; WiGig MAC and PHY Specification Version 1.1, Apr. 2011—Final Specification; 442 pages.
Wi-Fi Alliance Technical Committee P2P Task Group; Wi-Fi Peer-to-Peer (P2P) Technical Specification; Version 1.2; Dec. 14, 2011; 160 pages.
ETSI TS 136 300 V11.3.0 (Nov. 2012); LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11); Nov. 2012; 217 pages.
Perkins, "IP Mobility Support for IPv4, Revised", Internet Engineering Task Force (IETF), Request for Comments (RFC): 5944, (Mobile IPv4), Nov. 2010, 100 pages.
Perkins, et al., "Mobility Support in IPv6", Internet Engineering Task Force (IETF), Request for Comments (RFC): 6275, (Mobile IPv6), Jul. 2011, 169 pages.
Office Action for Taiwanese Patent Application Serial No. 104103469, mailed on Mar. 15, 2016, 9 pages. (Including 1 page of English translation.).
International Preliminary Report on Patentability for PCT/US2015/017645, mailed on Oct. 6, 2016, 6 pages.

* cited by examiner

APPARATUS, METHOD AND SYSTEM OF TETHERING BETWEEN A MOBILE DEVICE AND A NETWORK

TECHNICAL FIELD

Embodiments described herein generally relate to tethering between a mobile device and a network.

BACKGROUND

Some wireless communication devices, for example, mobile devices, e.g., Smartphones, may be configured to perform the functionality of a tethering device, e.g., a soft Access Point (AP), to provide a tethering service to one or more mobile devices.

The tethering device may be configured to enable data connectivity of one or more mobile devices to a network, e.g., to the Internet. For example, the tethering device may be configured to enable the one or more mobile devices to connect to the Internet via a cellular network, e.g., a Public Land Mobile Network (PLMN).

For example, a cellular device may maintain an Internet connection via a cellular network, and may communicate with one or more mobile devices via a Wireless Local Area Network (WLAN). The cellular device may perform the functionality of a tethering device to share the Internet connection with the mobile devices, for example, by serving as a soft AP to the mobile devices.

In order to provide a tethered link between the mobile devices and the network, the cellular device may be required to utilize two or more link connections of different types of wireless media (also referred to as "Radio Access technologies (RATs)"). For example, the cellular device may be required to use a WLAN link to communicate between the cellular device and the mobile devices, and a cellular link to communicate between the cellular device and the Internet. The two or more link connections may have different characteristics. For example, a cellular link connection may utilize a high mobility technology, e.g., supporting speeds of up to 200 Kilometer per hour (km/h), while a WLAN link connection may be configured to support static or nomadic channel conditions. The differences between the characteristics of the two or more RATs may result in an imbalance between the two or more link connections.

A performance of applications, for example, video-streaming applications, may be substantially affected by a weakest link of the tethering link.

Furthermore, the performance and/or capabilities of a cellular radio of the cellular device may be tailored, e.g., for reasons of cost, for specific capabilities of the cellular device, e.g. a screen size of a Smartphone.

Accordingly, the usage of the cellular device as a tethering device may be limited, and may not be able to provide a required level of performance.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
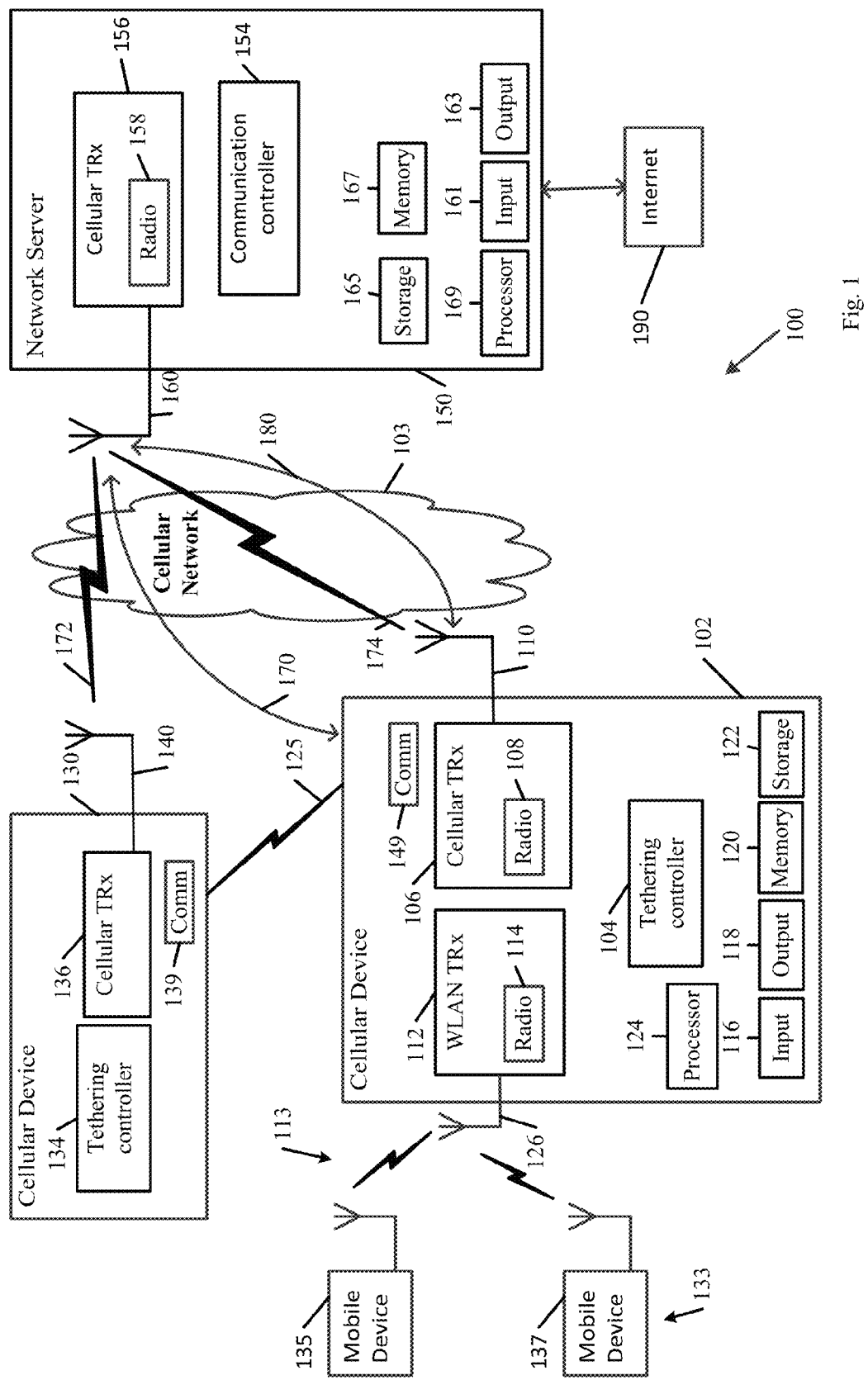
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE*802.11 *task group ac (TGac)* ("*IEEE*802.11-09/0308r12—*TGac Channel Model Addendum Document*"); *IEEE 802.11 task group ad (TGad)* (*IEEE P*802.11*ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 December, 2012); IEEE 802.11 task group ai (TGai)*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing Mobile Internet Protocol (IP) (MIP) specifications ("*IP Mobility Support for IPv4, Revised*", *Internet Engineering Task Force (IETF), Request for Comments (RFC)*: 5944, November 2010 (Mobile IPv4); and/or "*Mobility Support in IPv6*", *IETF, RFC 6275, July* 2011 (Mobile IPv6)) and/or future versions and/or derivatives thereof, devices and/or networks operating in accordance with existing cellular specifications and/or protocols, e.g., 3rd Generation Partnership Project (3GPP), 3GPP Long Term Evolution (LTE) (including *ETSI TS* 136 300 *V*11.3.0 (2012-11): *LTE; Evolved Universal Terrestrial Radio Access (E-UTRA) and Evolved Universal Terrestrial Radio Access Network (E-UTRAN); Overall description; Stage* 2 (3*GPP TS* 36.300 *version* 11.3.0 *Release* 11), 2012), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments are described herein with respect to a 3G cellular network. However, other embodiments may be implemented in any other suitable cellular network, e.g., a LTE cellular network, a 4G cellular network, a 5G cellular network, a WiMax cellular network, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "access point" (AP), as used herein, may include an entity that contains one station (STA) and provides access to distribution services, via the Wireless Medium (WM) for associated STAs.

Reference is now made to FIG. 1, which schematically illustrates a block diagram of a system 100, in accordance with some demonstrative embodiments.

As shown in FIG. 1, in some demonstrative embodiments, system 100 may include a cellular device 102 to tether between one or more mobile devices 133, e.g., mobile devices 135 and 137, and a network server 150 via a cellular network 103, e.g., as described in detail below.

In some demonstrative embodiments, cellular network 103 may include a Global System for Mobile (GSM) network, a Universal Mobile Telecommunications System (UMTS) network, a Long Term Evolution (LTE) network, an LTE-advanced network, a Fifth Generation (5G) network, or any other cellular network.

In some demonstrative embodiments, cellular device 102 may communicate with mobile devices 133 via a wireless local area network (WLAN) 113.

In some demonstrative embodiments, WLAN 113 may include, for example, one or more radio channels, IR channels, RF channels, and the like.

In some demonstrative embodiments, WLAN 113 may include, for example, a Wireless Fidelity (WiFi) link, a P2P link, a WiFi Direct (WFD) link, a Wireless Gigabit (WiGig) link, or any other link.

In some demonstrative embodiments, WLAN 113 may include, for example, a link over the 2.4 Gigahertz (GHz) or 5 GHz frequency band, the 60 GHz frequency band, or any other frequency band.

In other embodiments, WLAN 113 may include any other wireless communication network.

In some demonstrative embodiments, cellular device 102 and mobile devices 133 may include a WLAN transceiver (TRX) 112 to perform wireless communication via WLAN 113 between cellular device 102 and mobile devices 133 and/or with one or more other wireless communication devices, e.g., as described below.

In some demonstrative embodiments, WLAN TRX 112 may include at least one radio 114, which may include, for example, one or more wireless transmitters, receivers and/or transceivers able to send and/or receive wireless communication signals, RF signals, frames, blocks, transmission streams, packets, messages, data items, and/or data.

In some demonstrative embodiments, cellular device 102 may include a cellular transceiver (TRX) 106, and/or network server 150 may include a cellular TRX 156, to perform wireless communication over cellular network 103 between cellular device 102 and network server 150 and/or with one or more other devices, e.g., as described below.

In some demonstrative embodiments, cellular TRX 106 may include at least one radio 108 and/or cellular TRX 156 may include at least one radio 158. Radios 108 and/or 158 may include a multiple input multiple output (MIMO) transmitters receivers system (not shown), which may be capable of performing antenna beamforming methods, if desired. In other embodiments, radios 108 and/or 158 may include any other transmitters and/or receivers.

In some demonstrative embodiments, radios 108 and/or 158 may include a turbo decoder and/or a turbo encoder (not shown) to encode and/or decode data bits into data symbols, if desired. In other embodiments, radios 108 and/or 158 may include any other encoder and/or decoder.

In some demonstrative embodiments, radios 108 and/or 158 may include OFDM, OFDMA and/or SC-FDMA modulators and/or demodulators (not shown) configured to communicate OFDM or OFDMA signals over downlink channels, e.g., between network server 150 and cellular device 102, and/or SC-FDMA signals over uplink channels, e.g., between cellular device 102 and network server 150. In other embodiments, radios 108 and/or 158 may include any other modulators and/or demodulators.

In some demonstrative embodiments, cellular TRX 106 may communicate with network server 150 via a cellular link 174.

In some demonstrative embodiments, cellular device 102 may include a tethering controller 104 to control tethering between one or more mobile devices, e.g., mobile devices 133, and network server 150 via cellular network 103, e.g., as described below.

In some demonstrative embodiments, tethering controller 104 may control cellular device 102 to perform the functionality of a tethering device to provide a tethering service to mobile devices 133. In one example, tethering controller 104 may control cellular device 102 to perform the functionality of a soft Access Point (AP), a Mobile Hotspot, a Personal Hotspot, or any other tethering device.

In some demonstrative embodiments, network server 150 may be connected to a network, e.g., the Internet 190.

In some demonstrative embodiments, cellular device 102 may communicate with network server 150 to obtain access to Internet 190 via cellular link 174.

In some demonstrative embodiments, tethering controller 104 may be configured to enable data connectivity of mobile devices 133 to Internet 190, via network server 150, e.g., as described below.

In some demonstrative embodiments, tethering controller 104 may be configured to enable mobile devices 133 to connect to the Internet 190 via cellular network 103, e.g., as described below.

In some demonstrative embodiments, tethering controller 104 may establish an Internet connection with Internet 190 via cellular network 130, and may share the Internet connection to Internet 190 with mobile devices 133, for example, by serving as a soft AP or hotspot of the mobile devices 133, e.g., as described below.

In some demonstrative embodiments, network server 150 may include a communication controller 154 to control communication of cellular TRX 156 over cellular network 103, e.g., as described below.

In some demonstrative embodiments, WLAN TRX 112 may include, or may be associated with, one or more antennas 126, cellular TRX 106 may include, or may be associated with, one or more antennas 110, and/or cellular TRX 156 may include, or may be associated with, one or more antennas 160.

In some demonstrative embodiments, antennas 110, 126 and/or 160 may include any type of antennas suitable for transmitting and/or receiving wireless communication signals, blocks, frames, transmission streams, packets, messages and/or data. For example, antennas 110, 126 and/or 160 may include any suitable configuration, structure and/or arrangement of one or more antenna elements, components, units, assemblies and/or arrays. For example, antennas 110, 126 and/or 160 may include a phased array antenna, a dipole antenna, a single element antenna, a set of switched beam antennas, and/or the like.

In some embodiments, antennas 110, 126 and/or 160 may implement transmit and receive functionalities using separate transmit and receive antenna elements. In some embodiments, antennas 110, 126 and/or 160 may implement transmit and receive functionalities using common and/or integrated transmit/receive elements.

In some demonstrative embodiments, antennas 126 and 110 may utilize one or more separate antenna elements.

In some demonstrative embodiments, antennas 126 and 110 may utilize one or more shared antenna elements.

In some demonstrative embodiments, cellular TRX 106 and WLAN TRX 112 may include or may be implemented as part of one or more wireless Network Interface Cards (NICs), and the like.

In one example, cellular TRX 106 and WLAN TRX 112 may be implemented as part of a single NIC, e.g., capable of providing both cellular communication and WLAN communication functionalities. In another example, cellular TRX 106 and WLAN TRX 112 may be implemented by two separate NICs.

In some demonstrative embodiments, mobile devices 133 may include or may be implemented as part a mobile computer, a laptop computer, an Ultrabook™ computer, a notebook computer, a tablet computer, a handheld computer, a handheld device, a PDA device, a handheld PDA device, an on-board device, an off-board device, a consumer device, a vehicular device, a non-vehicular device, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a television, a music player, or the like.

In some demonstrative embodiments, cellular device 102 may include a mobile or portable device. In other embodiments, 102 may include a static or non-portable device. For example, cellular device 102 may include or may be implemented as part a mobile or non-mobile computing device having cellular connectivity, a cellular phone, a Smartphone, a MID, an on-board device, an off-board device, a hybrid device (e.g., combining cellular phone functionalities with PDA device functionalities), a consumer device, a vehicular device, a non-vehicular device, or the like.

In some demonstrative embodiments, cellular device 102 may include, for example, one or more of a processor 124, an input unit 116, an output unit 118, a memory unit 120, and a storage unit 122. Network server 150 may include, for example, one or more of a processor 169, an input unit 161, an output unit 163, a memory unit 167, and a storage unit 165. Cellular device 102 and/or network server 150 may optionally include other suitable hardware components and/or software components. In some demonstrative embodiments, some or all of the components of one or more of cellular device 102 and/or network server 150 may be enclosed in a common housing or packaging, and may be interconnected or operably associated using one or more wired or wireless links. In other embodiments, components of one or more of cellular device 102 and/or network server 150 may be distributed among multiple or separate devices.

Processor 124 and/or processor 169 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 124 executes instructions, for example, of an Operating System (OS) of cellular device 102 and/or of one or more suitable applications; and/or processor 169 executes instructions, for example, of an Operating System (OS) of network server 150 and/or of one or more suitable applications.

Input unit 116 and/or input unit 161 includes, for example, a keyboard, a keypad, a mouse, a touch-screen, a touch-pad, a track-ball, a stylus, a microphone, or other suitable pointing device or input device. Output unit 118 and/or output unit 163 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 and/or memory unit 167 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 and/or storage unit 165 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by cellular device 102; and/or memory unit 167 and/or storage unit 165, for example, may store data processed by network server 150.

In some demonstrative embodiments, cellular link 174 may have characteristics, for example, channel conditions, channel capacity, bandwidth, throughput, and the like, which may be different from the characteristics of WLAN links between cellular device 102 and mobile devices 133. For example, cellular link 174 may utilize a high mobility technology, for example, supporting speeds of up to 200 Kilometer per hour (km/h), while the WLAN links of WLAN 113 may be configured to support static or nomadic channel conditions.

In some demonstrative embodiments, the differences in the characteristics between cellular link 174 and the WLAN links of WLAN 113 may result in an imbalance between cellular link 174 and the WLAN links of WLAN 113.

In some demonstrative embodiments, the performance of applications running on mobile devices 133, for example, video-streaming applications, may be substantially affected by the differences between the characteristics of cellular link 174 and the WLAN links of WLAN 113.

In some demonstrative embodiments, cellular link 174 may provide limited link performance, for example, in comparison to WLAN 113, e.g., in terms of bandwidth, throughput, Quality of Service (QoS), Quality of Experience (QoE), delay, and the like. For example, the link performance of cellular link 174 may be lesser than a link performance required by one or more applications running on mobile devices 133.

In some demonstrative embodiments, tethering controller 104 may utilize at least one additional cellular link of at least one additional cellular device 130, for example, to enable extending a performance of a tethered service to mobile devices 133, e.g., as described below.

In some demonstrative embodiments, cellular device 130 may include a cellular TRX 136 to perform wireless communication over cellular network 103 between cellular device 130 and network server 150 and/or with one or more other devices, e.g., as described below. In some demonstrative embodiments, cellular TRX 136 may have a functionality similar to cellular TRX 106, e.g., as described above.

In some demonstrative embodiments, cellular TRX 136 may communicate with network server 150 via a cellular link 172.

In some demonstrative embodiments, cellular TRX 136 may include, or may be associated with, one or more antennas 140. In some demonstrative embodiments, antennas 140 may have a functionality similar to antennas 110, e.g., as described above.

In some demonstrative embodiments, cellular device 102 may communicate with cellular device 130 via a non-cellular link 125. For example, cellular device 102 may include a non-cellular communication interface 149, and cellular device 130 may include a non-cellular communication interface 139 to communicate between cellular devices 102 and 130 via no-cellular link 125.

In some demonstrative embodiments, non-cellular link 125 may include a wireless link.

In some demonstrative embodiments, non-cellular link 125 may include a WLAN link, a WiFi link, a P2P link, a WFD link, a WiGig link, a TDLS link, a FlashLinq link, a Bluetooth (BT) link, a BT Low Energy (BLE) link, a WPAN link, and/or any other link.

In some demonstrative embodiments, cellular device 130 may communicate with cellular device 125 as a member of WLAN 113. For example, non-cellular link 125 may include a WLAN link of WLAN 113.

In other embodiments, cellular device 130 may communicate with cellular device 125 as part of a WLAN separate from WLAN 113.

In some demonstrative embodiments, non-cellular communication interfaces 139 and 149 may include wireless communication interfaces.

In some demonstrative embodiments, non-cellular communication interfaces 139 and 149 may include WLAN communication units. In one example, WLAN TRX 112 may perform the functionality of non-cellular interface 149, and/or non-cellular interface 149 a WLAN TRX.

In some demonstrative embodiments, WLAN 112 and non-cellular communication interface may be implemented as part of a multi-MAC WiFi client communication unit.

In other embodiments, non-cellular link 125 may include a wired link, for example, a USB link, or any other wired link. For example, non-cellular communication interfaces 139 and/or 149 may include USB interfaces, or any other wired interfaces.

In some demonstrative embodiments, cellular device 130 may include a tethering controller 134 to control communication between mobile devices 133 and network server 150, via cellular devices 102 and 130, e.g., as described below.

In some demonstrative embodiments, tethering controller 104 may be configured to manage communication of traffic between the mobile devices 133 and network server 150 via a distributed access path, e.g., a distributed Internet access path.

In some demonstrative embodiments, the distributed access path may include a plurality of paths, e.g., a plurality of Internet Access paths, via a plurality of cellular links, e.g., as described below.

In some demonstrative embodiments, tethering controller 104 may be configured to manage the communication of traffic between the mobile devices 133 and network server 150 via a distributed access path, which may include a first path 180, including cellular link 174 between cellular device 102 and network server 150, and at least one second path 170, via at least one cellular device 130, e.g., as described below.

In some demonstrative embodiments, path 170 may include non-cellular link 125 between cellular device 102 and cellular device 130, and cellular link 172 between cellular device 130 and network server 150, e.g., as described below.

In some demonstrative embodiments, adding at least one access path 170 in addition to access path 180 may enable extending performance of the tethered link between mobile devices 133 and network server 150 via cellular network 103.

In some demonstrative embodiments, tethering controller 104 may manage a network layer of paths 170 and 180, e.g., as described below.

In some demonstrative embodiments, tethering controller 104 may select to establish path 170 based on a quality of Service (QoS) parameter, a Quality of Experience (QoE) parameter, a power consumption parameter, link budget parameter, for example, a parameter relating to one or more radio conditions, e.g., multipath, fading and the like, a link balancing parameter, for example, a load parameter relating to traffic load, a billing parameter, and/or any other parameter, e.g., as described below.

In some demonstrative embodiments, tethering controller 104 may control communication over the distributed access path, for example, by controlling the distribution between paths 180 and 170 of traffic communicated between mobile devices 133 and network server 150, e.g., as described below.

In some demonstrative embodiments, communication controller 154 may control the communication of traffic between network server 150 and mobile devices 133 via the distributed access path including paths 170 and 180, e.g., as described below.

In some demonstrative embodiments, cellular device 102 may receive uplink traffic from mobile devices 133 via WLAN 113, and may transmit the uplink traffic to network server 150 via path 170 and/or path 180, e.g., as described below.

In some demonstrative embodiments, tethering controller 104 may distribute the uplink traffic between paths 170 and 180, e.g., as described below.

In some demonstrative embodiments, tethering controller 104 may distribute the uplink traffic into first uplink traffic to be communicated via path 180 and second uplink traffic to be communicated via path 170.

In some demonstrative embodiments, tethering controller 104 may control cellular device 102 to transmit the first uplink traffic to network server 150 via cellular link 174.

In some demonstrative embodiments, tethering controller 104 may request cellular device 130 to communicate the second uplink traffic via cellular link 172 between cellular device 130 and network server 150.

In some demonstrative embodiments, tethering controller 104 may send the request to tethering controller 134 via link 125.

In some demonstrative embodiments, tethering controller 104 may control cellular device 102 to transmit the second uplink traffic to cellular device 130 via link 125.

In some demonstrative embodiments, tethering controller 134 may control cellular device 130 to receive the second uplink traffic via link 125, and to transmit the second uplink traffic to network server 150 via cellular link 172.

In some demonstrative embodiments, communication controller 154 may combine the uplink traffic received from mobile devices 133 via paths 170 and 180.

In some demonstrative embodiments, network controller 150 may transmit downlink traffic to be provided to mobile devices 133 via the distributed access path. For example, network server may transmit first downlink traffic via path 180, and/or second downlink traffic via path 170.

In some demonstrative embodiments, cellular device 102 may receive the first downlink traffic from network server 150 via cellular link 174.

In some demonstrative embodiments, cellular device 130 may receive the second downlink traffic from network server 150 via cellular link 172.

In some demonstrative embodiments, tethering controller 134 may control cellular device 130 to send the second downlink traffic to cellular device 102 via link 125.

In some demonstrative embodiments, tethering controller 104 may control cellular device 102 to receive the second downlink traffic via link 125.

In some demonstrative embodiments, tethering controller 104 may control cellular device 102 to transmit the first and second downlink traffic to mobile devices 133 via WLAN 113.

In some demonstrative embodiments, tethering controller 104 may control the distribution of the downlink traffic from network server 150 to mobile devices 133 via the distributed access path.

In other embodiments, communication controller 154 may determine which downlink traffic to communicate via path 170 and/or which downlink traffic to communicate via path 180.

For example, communication controller 154 may communicate over cellular link 172 downlink traffic corresponding to, in response to, and/or resulting from, uplink traffic communicated via link 172; and/or communication controller 154 may communicate over cellular link 174 downlink traffic corresponding to, in response to, and/or resulting from, uplink traffic communicated via link 174.

According to these embodiments, the distributed access path may be transparent to a functionality of network server 150. For example, communication controller 154 may communicate via links 172 and 174 as two separate and/or independent links.

In some demonstrative embodiments, tethering controller 104 may control the distribution of the downlink traffic between path 170 and 180. For example, tethering controller 104 may define for communication controller 154, which downlink traffic is to be communicated via path 170, and/or which downlink traffic is to be communicated via path 180.

In some demonstrative embodiments, tethering controller 104 may send configuration information to network server 150 to define and/or setup the distribution of the downlink traffic between paths 170 and 108. Communication controller 154 may distribute the downlink traffic between paths 170 and 180 based on the configuration information from tethering controller 104.

In some demonstrative embodiments, tethering controller 104 may request network server 150 to communicate traffic of path 170 via the cellular link 172 between cellular device 130 and network server 150.

In some demonstrative embodiments, tethering controller 104 may distribute the uplink and/or downlink traffic between paths 170 and 180, based on at least one parameter, for example, a quality of Service (QoS) parameter, a Quality of Experience (QoE) parameter, a power consumption parameter, a link budget parameter, for example, a parameter relating to one or more radio conditions, e.g., multipath, fading and the like, a link balancing parameter, for example, a load parameter relating to traffic load, a billing parameter, and/or any other parameter.

In one example, tethering controller 104 may distribute the uplink and/or downlink traffic between paths 170 and 180 based on billing information relating to a cost, e.g., to a user of cellular devices 102 and/or 130, of communicating over link 172 and/or a cost, e.g., to the user, of communicating over link 174. For example, tethering controller 104 may decrease an amount of traffic communicated via link 180, e.g., if cellular device 130 is approaching a quota for communicating over link 172.

In another example, tethering controller 104 may distribute the uplink and/or downlink traffic between paths 170 and 180 based on a QoS and/or a QoE achievable by cellular links 172 and/or 174, for example, with respect to a QoS and/or QoS requirement defined by an application to utilize the traffic communicated via the tethered link.

In another example, tethering controller 104 may distribute the uplink and/or downlink traffic between paths 170 and 180 based on a power state and/or power consumption of cellular devices 102 and/or 130. For example, tethering controller 104 may decrease an amount of traffic communicated via link 180, e.g., if a battery of cellular device 130 is at a lower power state.

In other embodiments, tethering controller 104 may distribute the uplink and/or downlink traffic between paths 170 and 180 based on any other additional and/or alternative parameter and/or criterion.

In some demonstrative embodiments, tethering controller 104 may coordinate with tethering controller 134 the distribution of the traffic between paths 170 and 180.

In some demonstrative embodiments, tethering controllers 104 and 134 may be configured to form a shared tethering entity in a manner which may be transparent to mobile devices 133 and/or network server 150, e.g., such that mobile devices 133 and/or network server 150 may communicate with cellular devices 102 and 130 acting as a single tethering device.

In some demonstrative embodiments, the traffic between mobile devices 133 and network server 150 may be communicated in the form of Mobile Internet Protocol (IP) (MIP) traffic. For example, network server 150 may perform the functionality of a Server MIP (SMIP).

In some demonstrative embodiments, tethering controller 104 and tethering controller 134 may maintain a single shared MIP connection with network sever 150 via both paths 170 and 180.

In some demonstrative embodiments, tethering controllers 104 and 134 may maintain a single shared MIP context to network server 150.

In some demonstrative embodiments, tethering controllers 104 and 134 may perform the functionality of a shared Client MIP (CMIP) context. For example, tethering controllers 104 and 134 may utilize a user plane of link 125 to exchange information to maintain and/or manage the shared CMIP context.

In some demonstrative embodiments, the shared CMIP context may function as a single CMIP with respect to mobile devices 133 and/or network server 150.

In some demonstrative embodiments, tethering controllers 104 and 134 may maintain a distributed MIP layer-3 context for cellular links 172 and 174, for example, by using different and/or independent Transmission Control Protocol (TCP) parameters, e.g. TCP receive/transmit window, IP addressing, and the like. Additionally or alternatively, tethering controllers 104 and 134 may maintain a distributed connection management functionality for cellular links 172 and 174, e.g., by independently and/or separately managing load balancing, link resiliency, and the like, of cellular links 172 and 174.

In some demonstrative embodiments, the distributed access path between cellular device 102 and network server 150 may provide a split Internet IP solution, between at least two Internet access devices, e.g., cellular devices 102 and 130. For example, the distributed access path may enable Internet access path connectivity through either one or both of paths 170 and 180.

In some demonstrative embodiments, the distributed access path between cellular device 102 and network server 150 may enable achieving an improved end-to-end Internet connection between mobile devices 133 and network server 150.

In some demonstrative embodiments, the distributed access path between cellular device 102 and network server 150 may provide cellular link resiliency, e.g., between links 172 and 174, which may enable providing continuous Internet access to mobile devices 133.

In some demonstrative embodiments, the distributed access path between cellular device 102 and network server 150 may enable cellular load balancing. For example, tethering controller 104 may balance the load over links 172 and 174 by controllably distributing the traffic between paths 170 and 180, e.g., as described above.

In some demonstrative embodiments, the distributed access path between cellular device 102 and network server 150 may enable improved Physical Layer (PHY) resource utilization, e.g. by enabling increased Hybrid-Automatic-Repeat-Request (HARM) buffering capabilities via cellular links 172 and 174.

In some demonstrative embodiments, the distributed access path between cellular device 102 and network server 150 may enable extended throughput of the tethered link between mobile devices 133 and network server 150, e.g., compared to a throughput achievable by only a single direct link between cellular device 102 and network server 150, e.g., via cellular link 174.

In some demonstrative embodiments, the distributed access path between cellular device 102 and network server 150 may enable backward compatibility, e.g., with system elements in a transparent manner. For example, existing core network architecture may be preserved, since tethering controller 104 may manage the distributed access path in a manner compatible with a standard, e.g., non-modified, SMIP endpoint, and/or standard, e.g., non-modified mobile devices, e.g., as described above.

Figure 2:
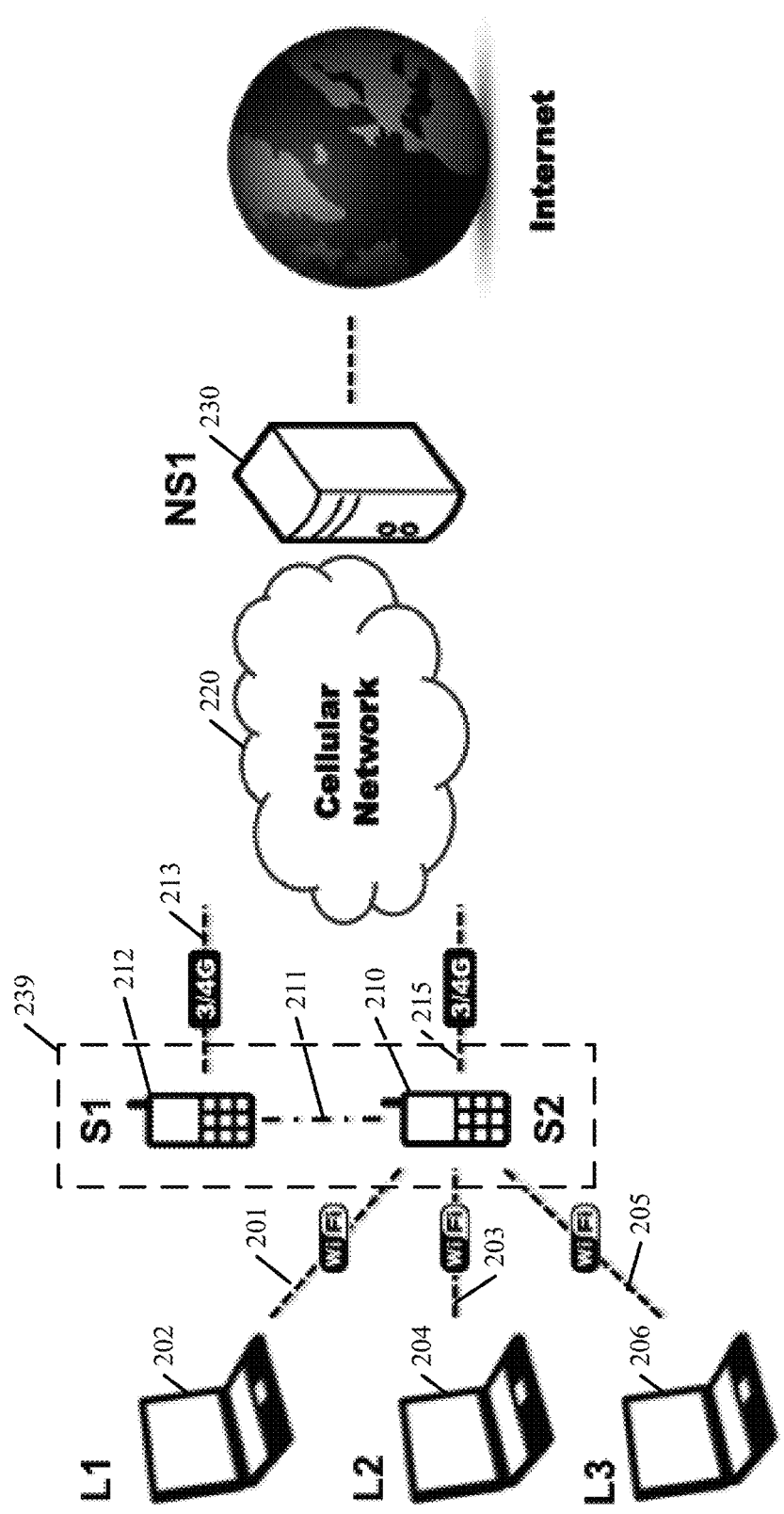
FIG. 2 is a schematic illustration of a deployment of elements of a communication system, in accordance with some demonstrative embodiments.

Reference is made to FIG. 2, which schematically illustrates a deployment of elements of a communication system 200, in accordance with some demonstrative embodiments. In some demonstrative embodiments, system 200 may perform the functionality of system 100 (FIG. 1).

In some demonstrative embodiments, system 200 may include a Smartphone 210, denoted S1, to communicate with a plurality of laptops via a plurality of WiFi links. For example, Smartphone 210 may communicate with a laptop 202, denoted L1, via a WiFi link 201, Smartphone 210 may communicate with a laptop 204, denoted L2, via a WiFi link 203, and/or Smartphone 210 may communicate with a laptop 206, denoted L3, via a WiFi link 205. For example, Smartphone 210 may perform the functionality of cellular device 102 (FIG. 1), and/or laptops 202, 204 and/or 206 may perform the functionality of three mobile devices 133 (FIG. 1).

In some demonstrative embodiments, Smartphone 210 may communicate with a network server 230, denoted NS1, via a cellular link 215 of a cellular network 220. Network server 230 may be connected to the Internet. For example, network server 230 may perform the functionality of network server 150 (FIG. 1).

In some demonstrative embodiments, Smartphone 210 may be connected to a Smartphone 212, denoted S2, via a WiFi link 211. Smartphone 212 may communicate with network server 230 via a cellular link 213 of cellular network 220. For example, Smartphone 212 may perform the functionality of cellular device 130 (FIG. 1), and/or link 211 may perform the functionality of link 125 (FIG. 1).

In some demonstrative embodiments, Smartphones 210 and 212 may have Internet access via links 213 and 215.

In some demonstrative embodiments, Smartphone 210 may perform the functionality of a tethering device to tether between laptops 202, 204, and 206 and network server 230 via a distributed access path including a first path via cellular link 215 and a second path via cellular link 213, e.g., as described above.

In some demonstrative embodiments, network server 230 may perform the functionality of a SMIP, and Smartphones 210 and 212 may perform the functionality of a shared CMIP 239 sharing a single MIP connection to network server 230, e.g., as described above.

Figure 3:
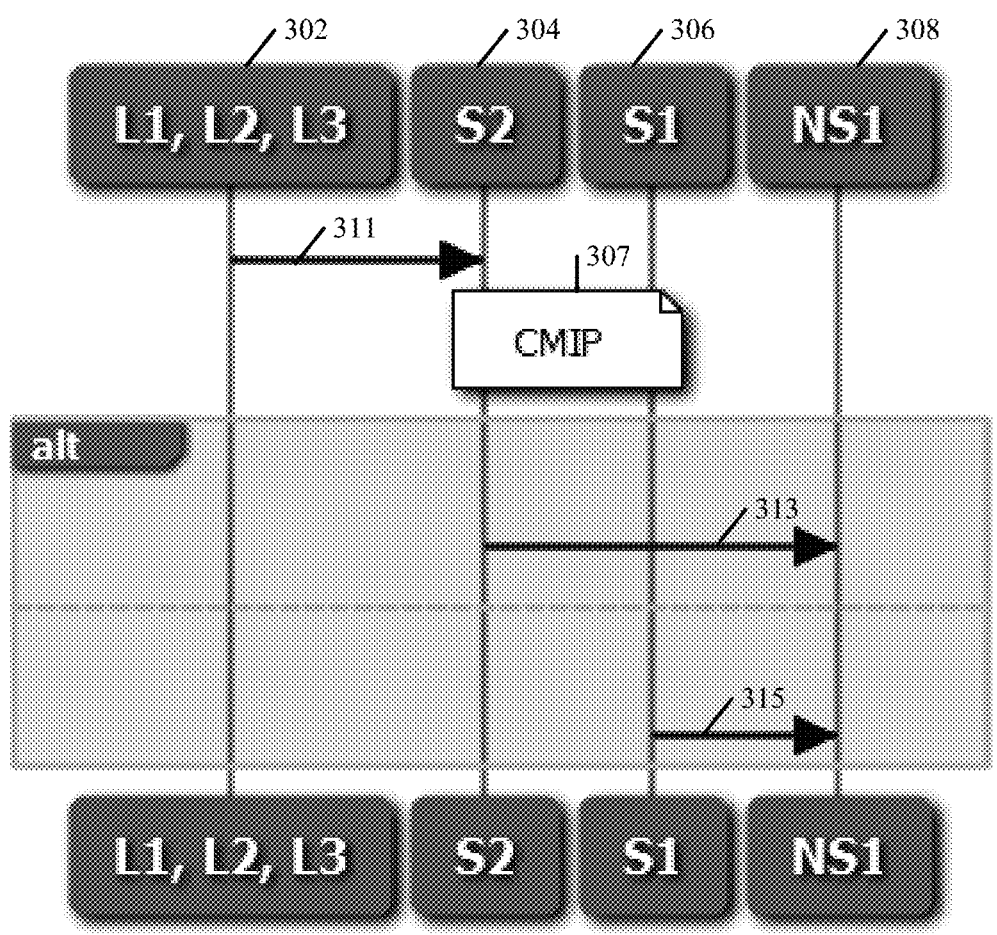
FIG. 3 is a schematic sequence diagram illustration demonstrating operations and interactions between devices engaged in a tethered uplink communication, in accordance with some demonstrative embodiments.

FIG. 3 is a schematic sequence diagram illustration demonstrating operations and interactions between a plurality of mobile devices 302, a first cellular device 304, a second cellular device 306, and a network server 308, engaged in a tethered uplink communication, in accordance with some demonstrative embodiments. For example, mobile devices 302 may perform the functionality of laptops 202, 204 and 206 (FIG. 2), cellular device 304 may perform the functionality of Smartphone 210 (FIG. 2), cellular device 306 may perform the functionality of Smartphone 212 (FIG. 2), and/or network server 308 may perform the functionality of network server 230 (FIG. 2).

As Shown in FIG. 3, cellular devices 304 and 306 may maintain a single shared CMIP entity 307 with respect to mobile devices 302 and/or network server 308, e.g., as described above.

As shown in FIG. 3, mobile devices 302 may send uplink traffic 311 to cellular device 304. For example, mobile devices 302 may communicate with cellular device 304 via a WLAN network, e.g., as described above. For example, cellular device 304 may perform the functionality of a soft AP with respect to mobile devices 302, e.g., as described above.

As shown in FIG. 3, CMIP 307 may distribute the uplink traffic 311 between a first cellular link 313, e.g., cellular link 174 (FIG. 1), between cellular device 304 and network server 308, and a second cellular link 315, e.g., cellular link 172 (FIG. 1), between cellular device 306 and network server 308.

In some demonstrative embodiments, the uplink traffic to be transmitted via link 315 may be transmitted from cellular device 304 to cellular device 306 via a non-cellular link, e.g., link 125 (FIG. 1).

In some demonstrative embodiments, the cellular links 313 and 315 may include separate and independent links, which may be managed by cellular devices 304 and 306, e.g., separately and/or independently.

Figure 4:
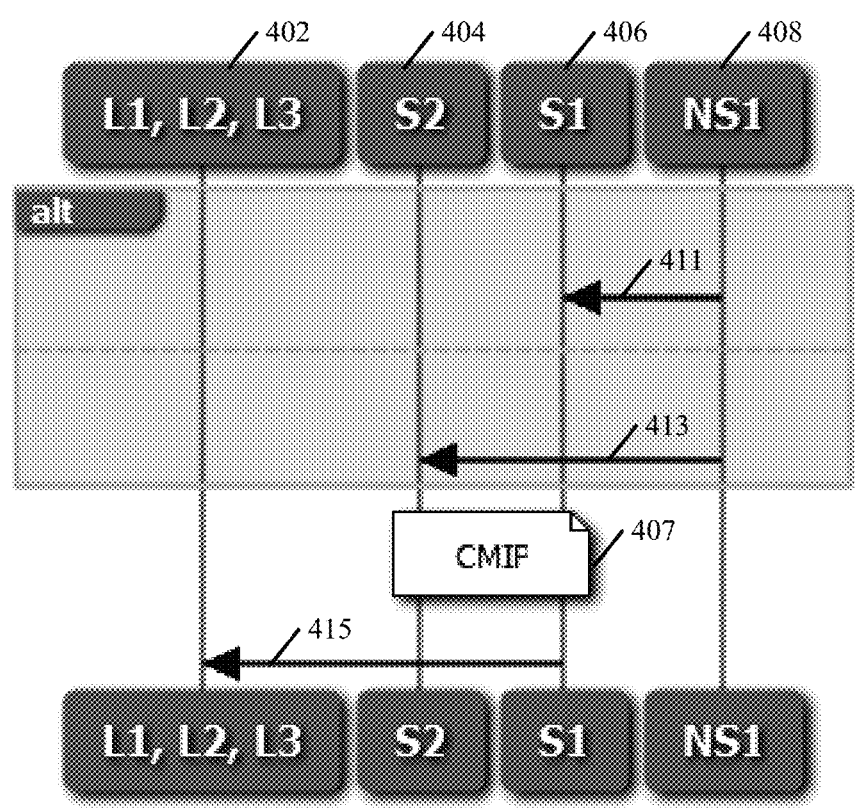
FIG. 4 is a schematic sequence diagram illustration demonstrating operations and interactions between devices engaged in a tethered downlink communication, in accordance with some demonstrative embodiments.

FIG. 4 is a schematic sequence diagram illustration demonstrating operations and interactions between a plurality of mobile devices 402, a first cellular device 404, a second cellular device 406, and a network server 408, engaged in a tethered downlink communication, in accordance with some demonstrative embodiments. For example, mobile devices 402 may perform the functionality of laptops 202, 204 and 206 (FIG. 2), cellular device 404 may perform the functionality of Smartphone 210 (FIG. 2), cellular device 406 may perform the functionality of Smartphone 212 (FIG. 2), and/or network server 408 may perform the functionality of network server 230 (FIG. 2).

As Shown in FIG. 4, cellular devices 404 and 406 may maintain a single shared CMIP entity 407 with respect to mobile devices 402 and/or network server 408, e.g., as described above.

As shown in FIG. 4, network server 408 may send downlink traffic to CMIP 307 via a first cellular link 411 and a second cellular link 4123. Cellular link 411 may include a cellular link, e.g., cellular link 172 (FIG. 1), between cellular device 406 and network server 408. Cellular link 413 may include a cellular link, e.g., cellular link 174 (FIG. 1), between cellular device 404 and network server 408.

In some demonstrative embodiments, the downlink traffic of link 411 may be transmitted from cellular device 406 to cellular device 404 via a non-cellular link, e.g., link 125 (FIG. 1).

In some demonstrative embodiments, the cellular links 411 and 413 may include separate and independent links, which may be managed by cellular devices 406 and 404, e.g., separately and/or independently.

As shown in FIG. 4, cellular device 404 may transmit the downlink traffic to mobile devices 402 via one or more links 415. For example, mobile devices 402 may communicate with cellular device 404 via a WLAN network, e.g., as described above. For example, cellular device 404 may perform the functionality of a soft AP with respect to mobile devices 402, e.g., as described above.

Figure 5:
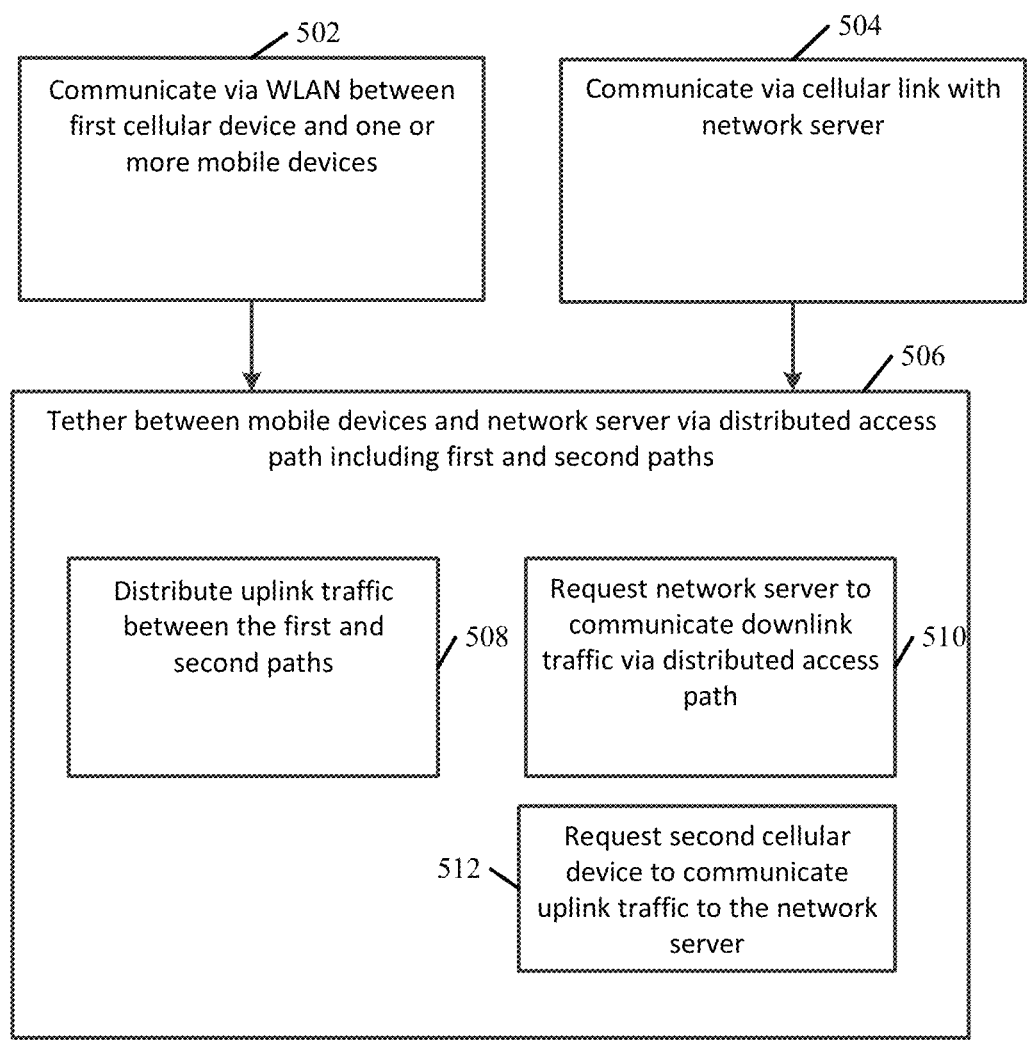
FIG. 5 is a schematic flow-chart illustration of a method of tethering between a mobile device and a network, in accordance with some demonstrative embodiments.

Reference is made to FIG. 5, which schematically illustrates a method of a tethering between a mobile device and a network, in accordance with some demonstrative embodiments. In some demonstrative embodiments, one or more of the operations of the method of FIG. 5 may be performed by one or more elements of a system, e.g., system 100 (FIG. 1), and/or system 200 (FIG. 2). In one example, one or more of the operations of the method of FIG. 5 may be performed at a first cellular device, e.g., cellular device 102 (FIG. 1), and/or a tethering controller, e.g., tethering controller 104 (FIG. 1), to tether between one or more mobile devices, e.g., mobile devices 133 (FIG. 1) and a network server, e.g., network server 150 (FIG. 1).

As indicated at block 502, the method may include communicating via a wireless local area network (WLAN) between the first cellular device and the one or more mobile devices. For example, cellular device 102 (FIG. 1) may communicate via WLAN 113 (FIG. 1) with mobile devices 133 (FIG. 1), e.g., as described above.

As indicated at block 504, the method may include communicating via a cellular network link between the first cellular device and the network server. For example, device 102 (FIG. 1) may communicate via cellular link 174 (FIG. 1) with network server 150 (FIG. 1), e.g., as described above.

As indicated at block 506, the method may include tethering between the one or more mobile devices and the network server by communicating traffic between the mobile devices and the network server via a distributed access path including a first path and at least one second path.

In some demonstrative embodiments, the first path may include the cellular network link between the first cellular device and the network server, and the second path may include a non-cellular link between the first cellular device and a second cellular device. For example, tethering controller 104 (FIG. 1) may tether between mobile devices 133 (FIG. 1) and network server 150 (FIG. 1) by communicating traffic via the distributed access path including path 170 (FIG. 1) and path 180 (FIG. 1), e.g., as described above.

As indicated at block 508, tethering between the mobile devices and the network server may include distributing uplink traffic from the mobile devices between the first and second paths. For example, tethering controller 104 (FIG. 1) may distribute uplink traffic from mobile devices 133 (FIG. 1) between paths 170 (FIG. 1) and 180 (FIG. 1), e.g., as describes above.

As indicated at block 510, tethering between the mobile devices and the network server may include requesting the network server to communicate downlink traffic via the distributed access path. For example, tethering controller 104 (FIG. 1) may request network server 150 (FIG. 1) to transmit traffic of path 170 (FIG. 1) via cellular network link 172 (FIG. 1) between cellular device 130 (FIG. 1) and network server 150 (FIG. 1).

As indicated at block 512, tethering between the mobile devices and the network server may include requesting a second cellular device to communicate uplink traffic from the mobile devices to the network server. For example, tethering controller 104 (FIG. 1) may request cellular device 130 (FIG. 1) to communicate uplink traffic of path 170 (FIG. 1) via cellular network link 172 (FIG. 1), e.g., as described above.

Figure 6:
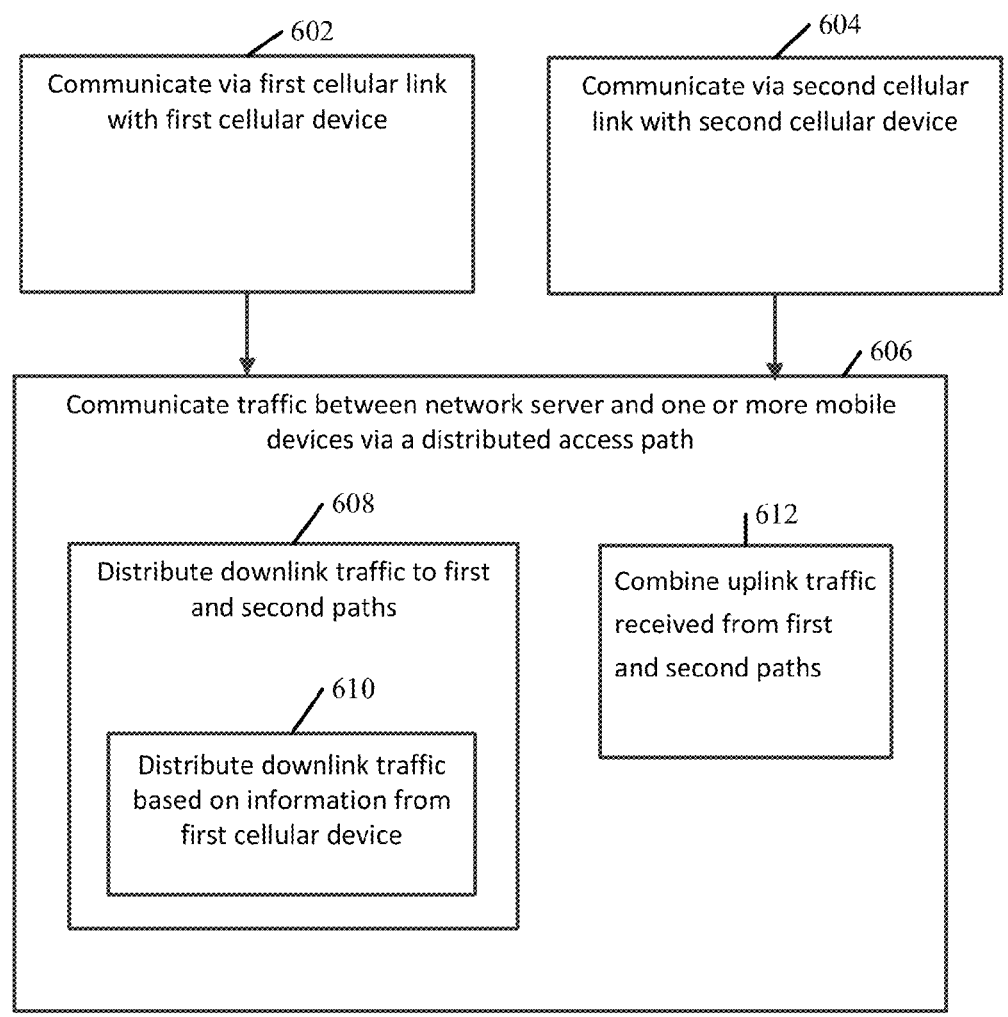
FIG. 6 is a schematic flow-chart illustration of a method of tethering between a mobile device and a network, in accordance with some demonstrative embodiments.

Reference is made to FIG. 6, which schematically illustrates a method of a tethering between a mobile device and a network, in accordance with some demonstrative embodiments. In some demonstrative embodiments, one or more of the operations of the method of FIG. 6 may be performed by one or more elements of a system, e.g., system 100 (FIG. 1), and/or system 200 (FIG. 2). For example, one or more of the operations of the method of FIG. 6 may be performed by a network server, e.g., network server 150 (FIG. 1), and/or a communication controller, e.g., communication controller 154 (FIG. 1), to communicate with one or more mobile devices, e.g., mobile devices 133 (FIG. 1).

As indicated at block 602, the method may include communicating via a first cellular network link with a first cellular device. For example, network server 150 (FIG. 1) may communicate via cellular link 174 (FIG. 1) with cellular device 102 (FIG. 1), e.g., as described above.

As indicated at block 604, the method may include communicating via a second cellular network link with a second cellular device. For example, network server 150 (FIG. 1) may communicate via cellular link 172 (FIG. 1) with cellular device 130 (FIG. 1), e.g., as described above.

As indicated at block 606, the method may include communicating traffic between the network server and one or more mobile devices, which are connected to the first cellular device, by communicating the traffic via a distributed access path, which is distributed between at least first and second paths. The first path may include the first cellular network link, and the second path may include the second cellular link. For example, network server 150 (FIG. 1) may communicate with mobile devices 133 (FIG. 1) via the distributed access path including path 170 (FIG. 1) and path 180 (FIG. 1), e.g., as described above.

As indicated at bock 608, communicating the traffic between the network server and the mobile devices may include distributing downlink traffic to the first and second paths. For example, network server 150 (FIG. 1) may distribute the downlink traffic to mobile devices 133 (FIG. 1) to paths 170 and 180 (FIG. 1).

As indicated at block 610, distributing the downlink traffic may include distributing the downlink traffic based on configuration information from the first cellular device. For example, network server 150 (FIG. 1) may distribute the downlink traffic to mobile devices 133 (FIG. 1) based on configuration information from tethering controller 104 (FIG. 1), e.g., as described above.

As indicated at block 612, communicating the traffic between the network server and the mobile devices may include combining uplink information received from the first and second paths. For example, network server 150 (FIG. 1) may combine uplink information from mobile devices 133 (FIG. 1) received via links 172 and 174 (FIG. 1), e.g., as described above.

Figure 7:
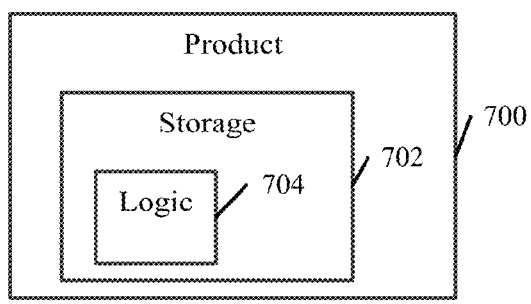
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of cellular device 102, cellular device 130 (FIG. 1), tethering controller 104 (FIG. 1), tethering controller 134 (FIG. 1), network server 150 (FIG. 1), communication controller 154 (FIG. 1), and/or to perform one or more of the operations of the method of FIG. 5 and/or FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a tethering controller to control at first cellular device tethering between one or more mobile devices and a network server, via a wireless local area network (WLAN) between the first cellular device and the mobile devices, the tethering controller to manage communication of traffic between the mobile devices and the network server via a distributed access path including a first path and at least one second path, the first path including a cellular network link between the first cellular device and the network server, and the second path including a non-cellular link between the first cellular device and a second cellular device.

Example 2 includes the subject matter of Example 1, and optionally, wherein the tethering controller is to distribute between the first and second paths traffic received from the mobile devices via the WLAN.

Example 3 includes the subject matter of Example 1 or 2, and optionally, wherein the tethering controller is to send to the mobile devices traffic received from the server network via the first and second paths.

Example 4 includes the subject matter of any one of Examples 1-3, and optionally, wherein the tethering controller is to request the second cellular device to communicate traffic of the second path via a cellular network link between the second cellular device and the network server.

Example 5 includes the subject matter of any one of Examples 1-4, and optionally, wherein the tethering controller is to request the network server to communicate traffic of the second path via a cellular network link between the second cellular device and the network server.

Example 6 includes the subject matter of any one of Examples 1-5, and optionally, wherein the tethering controller is to distribute the traffic between the first and second paths based on at least one parameter selected from the group consisting of a quality of Service (QoS) parameter, a Quality of Experience (QoE) parameter, a power consumption parameter, a link balancing parameter, a link budget parameter, and a billing parameter.

Example 7 includes the subject matter of any one of Examples 1-6, and optionally, wherein the tethering controller is to manage a network layer of the first and second paths.

Example 8 includes the subject matter of any one of Examples 1-7, and optionally, wherein the distributed access path comprises a distributed Internet access path.

Example 9 includes the subject matter of any one of Examples 1-8, and optionally, wherein the tethering controller is to maintain a single Mobile Internet Protocol (MIP) connection with the network server via the first and second paths.

Example 10 includes the subject matter of any one of Examples 1-9, and optionally, wherein the traffic comprises Mobile Internet Protocol (MIP) traffic.

Example 11 includes the subject matter of any one of Examples 1-10, and optionally, wherein the tethering controller is to establish the second path based on at least one parameter selected from the group consisting of a quality of Service (QoS) parameter, a Quality of Experience (QoE) parameter, a power consumption parameter, a link balancing parameter, a link budget parameter, and a billing parameter.

Example 12 includes the subject matter of any one of Examples 1-11, and optionally, wherein the non-cellular link comprises at least one wireless communication link.

Example 13 includes the subject matter of Example 12, and optionally, wherein the wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

Example 14 includes an apparatus of wireless communication, the apparatus comprising a communication controller to control at a network server communication of traffic between the network server and one or more mobile devices via a distributed access path, which is distributed between at least first and second paths, the first path including a first cellular network link between the network server and a first cellular device, and the second path including a second cellular link between the network server and a second cellular device.

Example 15 includes the subject matter of Example 14, and optionally, wherein the communication controller is to distribute between the first and second paths traffic from the network server to the mobile devices.

Example 16 includes the subject matter of Example 15, and optionally, wherein the communication controller is to distribute the traffic from the network server between the first and second paths based on configuration information from the first cellular device.

Example 17 includes the subject matter of any one of Examples 14-16, and optionally, wherein the communication controller is to combine traffic received from the mobile devices via the first and second paths.

Example 18 includes the subject matter of any one of Examples 14-17, and optionally, wherein the distributed access path comprises a distributed Internet access path.

Example 19 includes the subject matter of any one of Examples 14-18, and optionally, wherein the traffic comprises Mobile Internet Protocol (MIP) traffic.

Example 20 includes the subject matter of any one of Examples 14-19, and optionally, wherein the communication controller is to maintain a signal Mobile Internet Protocol (MIP) connection with the first cellular device via the first and second paths.

Example 21 includes a first cellular device comprising at least one antenna; a memory; a processor; a cellular transceiver to communicate with a network server via a cellular network link; a wireless local area network (WLAN) transceiver to communicate with one or more mobile devices via a WLAN; and a tethering controller to control tethering between the one or more mobile devices and the network server via the WLAN, the tethering controller to manage communication of traffic between the mobile devices and the network server via a distributed access path including a first path and at least one second path, the first path including the cellular network link, and the second path including a non-cellular link between the first cellular device and a second cellular device.

Example 22 includes the subject matter of Example 21, and optionally, wherein the tethering controller is to distribute between the first and second paths traffic received from the mobile devices via the WLAN.

Example 23 includes the subject matter of Example 21 or 22, and optionally, wherein the tethering controller is to send to the mobile devices traffic received from the server network via the first and second paths.

Example 24 includes the subject matter of any one of Examples 21-23, and optionally, wherein the tethering controller is to request the second cellular device to communicate traffic of the second path via a cellular network link between the second cellular device and the network server.

Example 25 includes the subject matter of any one of Examples 21-24, and optionally, wherein the tethering controller is to request the network server to communicate traffic of the second path via a cellular network link between the second cellular device and the network server.

Example 26 includes the subject matter of any one of Examples 21-25, and optionally, wherein the tethering controller is to distribute the traffic between the first and second paths based on at least one parameter selected from the group consisting of a quality of Service (QoS) parameter, a Quality of Experience (QoE) parameter, a power consumption parameter, a link balancing parameter, a link budget parameter, and a billing parameter.

Example 27 includes the subject matter of any one of Examples 21-26, and optionally, wherein the tethering controller is to manage a network layer of the first and second paths.

Example 28 includes the subject matter of any one of Examples 21-27, and optionally, wherein the distributed access path comprises a distributed Internet access path.

Example 29 includes the subject matter of any one of Examples 21-28, and optionally, wherein the tethering controller is to maintain a single Mobile Internet Protocol (MIP) connection with the network server via the first and second paths.

Example 30 includes the subject matter of any one of Examples 21-29, and optionally, wherein the traffic comprises Mobile Internet Protocol (MIP) traffic.

Example 31 includes the subject matter of any one of Examples 21-30, and optionally, wherein the tethering controller is to establish the second path based on at least one parameter selected from the group consisting of a quality of Service (QoS) parameter, a Quality of Experience (QoE) parameter, a power consumption parameter, a link balancing parameter, a link budget parameter, and a billing parameter.

Example 32 includes the subject matter of any one of Examples 21-31, and optionally, wherein the non-cellular link comprises at least one wireless communication link.

Example 33 includes the subject matter of Example 32, and optionally, wherein the wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

Example 34 includes a network server comprising a memory; a processor; a cellular transceiver to communicate with a first cellular device via a first cellular network link, and to communicate with a second device via a second cellular network link; and a communication controller to control communication of traffic between the network server and one or more mobile devices, which are connected to the first cellular device, the communication controller to control communication of the traffic via a distributed access path, which is distributed between at least first and second paths, the first path including the first cellular network link, and the second path including the second cellular link.

Example 35 includes the subject matter of Example 34, and optionally, wherein the communication controller is to distribute between the first and second paths traffic from the network server to the mobile devices.

Example 36 includes the subject matter of Example 35, and optionally, wherein the communication controller is to distribute the traffic from the network server between the first and second paths based on configuration information from the first cellular device.

Example 37 includes the subject matter of any one of Examples 34-36, and optionally, wherein the communication controller is to combine traffic received from the mobile devices via the first and second paths.

Example 38 includes the subject matter of any one of Examples 34-37, and optionally, wherein the distributed access path comprises a distributed Internet access path.

Example 39 includes the subject matter of any one of Examples 34-38, and optionally, wherein the traffic comprises Mobile Internet Protocol (MIP) traffic.

Example 40 includes the subject matter of any one of Examples 34-39, and optionally, wherein the communication controller is to maintain a signal Mobile Internet Protocol (MIP) connection with the first cellular device via the first and second paths.

Example 41 includes a method performed at a first cellular device, the method comprising communicating with one or more mobile devices via a wireless local area network (WLAN) between the first cellular device and the mobile devices; communicating with a network server via a cellular network link between the first cellular device and the network server; and tethering between the one or more mobile devices and the network server by communicating traffic between the mobile devices and the network server via a distributed access path including a first path and at least one second path, the first path including the cellular network link, and the second path including a non-cellular link between the first cellular device and a second cellular device.

Example 42 includes the subject matter of Example 41, and optionally, comprising distributing between the first and second paths traffic received from the mobile devices via the WLAN.

Example 43 includes the subject matter of Example 41 or 42, and optionally, comprising sending to the mobile devices traffic received from the server network via the first and second paths.

Example 44 includes the subject matter of any one of Examples 41-43, and optionally, comprising requesting the second cellular device to communicate traffic of the second path via a cellular network link between the second cellular device and the network server.

Example 45 includes the subject matter of any one of Examples 41-44, and optionally, comprising requesting the network server to communicate traffic of the second path via a cellular network link between the second cellular device and the network server.

Example 46 includes the subject matter of any one of Examples 41-45, and optionally, comprising distributing the traffic between the first and second paths based on at least one parameter selected from the group consisting of a quality of Service (QoS) parameter, a Quality of Experience (QoE) parameter, a power consumption parameter, a link balancing parameter, a link budget parameter, and a billing parameter.

Example 47 includes the subject matter of any one of Examples 41-46, and optionally, comprising managing a network layer of the first and second paths.

Example 48 includes the subject matter of any one of Examples 41-47, and optionally, wherein the distributed access path comprises a distributed Internet access path.

Example 49 includes the subject matter of any one of Examples 41-48, and optionally, comprising maintaining a single Mobile Internet Protocol (MIP) connection with the network server via the first and second paths.

Example 50 includes the subject matter of any one of Examples 41-49, and optionally, wherein the traffic comprises Mobile Internet Protocol (MIP) traffic.

Example 51 includes the subject matter of any one of Examples 41-50, and optionally, comprising establishing the second path based on at least one parameter selected from the group consisting of a quality of Service (QoS) parameter, a Quality of Experience (QoE) parameter, a power consumption parameter, a link balancing parameter, a link budget parameter, and a billing parameter.

Example 52 includes the subject matter of any one of Examples 41-51, and optionally, wherein the non-cellular link comprises at least one wireless communication link.

Example 53 includes the subject matter of Example 52, and optionally, wherein the wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

Example 54 includes a method performed at a network server, the method comprising communicating with a first cellular device over a first cellular link; communicating with a second cellular device over a second cellular link; and communicating traffic between the network server and one or more mobile devices, which are connected to the first cellular device, by communicating the traffic via a distributed access path, which is distributed between at least first and second paths, the first path including the first cellular network link, and the second path including the second cellular link.

Example 55 includes the subject matter of Example 54, and optionally, comprising distributing between the first and second paths traffic from the network server to the mobile devices.

Example 56 includes the subject matter of Example 55, and optionally, comprising distributing the traffic from the network server between the first and second paths based on configuration information from the first cellular device.

Example 57 includes the subject matter of any one of Examples 54-56, and optionally, comprising combining traffic received from the mobile devices via the first and second paths.

Example 58 includes the subject matter of any one of Examples 54-57, and optionally, wherein the distributed access path comprises a distributed Internet access path.

Example 59 includes the subject matter of any one of Examples 54-58, and optionally, wherein the traffic comprises Mobile Internet Protocol (MIP) traffic.

Example 60 includes the subject matter of any one of Examples 54-59, and optionally, comprising maintaining a signal Mobile Internet Protocol (MIP) connection with the first cellular device via the first and second paths.

Example 61 includes a product including one or more tangible computer-readable non-transitory storage media comprising computer-executable instructions operable to, when executed by at least one computer processor, enable the at least one computer processor to implement a method comprising at a first cellular device, communicating with one or more mobile devices via a wireless local area network (WLAN) between the first cellular device and the mobile devices; communicating between the first cellular device and a network server via a cellular network link between the first cellular device and a network server; and tethering between the one or more mobile devices and the network server by communicating traffic between the mobile devices and the network server via a distributed access path including a first path and at least one second path, the first path including the cellular network link, and the second path including a non-cellular link between the first cellular device and a second cellular device.

Example 62 includes the subject matter of Example 61, and optionally, wherein the method comprises distributing between the first and second paths traffic received from the mobile devices via the WLAN.

Example 63 includes the subject matter of Example 61 or 62, and optionally, wherein the method comprises sending to the mobile devices traffic received from the server network via the first and second paths.

Example 64 includes the subject matter of any one of Examples 61-63, and optionally, wherein the method comprises requesting the second cellular device to communicate traffic of the second path via a cellular network link between the second cellular device and the network server.

Example 65 includes the subject matter of any one of Examples 61-64, and optionally, wherein the method comprises requesting the network server to communicate traffic of the second path via a cellular network link between the second cellular device and the network server.

Example 66 includes the subject matter of any one of Examples 61-65, and optionally, wherein the method comprises distributing the traffic between the first and second paths based on at least one parameter selected from the group consisting of a quality of Service (QoS) parameter, a Quality of Experience (QoE) parameter, a power consumption parameter, a link balancing parameter, a link budget parameter, and a billing parameter.

Example 67 includes the subject matter of any one of Examples 61-66, and optionally, wherein the method comprises managing a network layer of the first and second paths.

Example 68 includes the subject matter of any one of Examples 61-67, and optionally, wherein the distributed access path comprises a distributed Internet access path.

Example 69 includes the subject matter of any one of Examples 61-68, and optionally, wherein the method comprises maintaining a single Mobile Internet Protocol (MIP) connection with the network server via the first and second paths.

Example 70 includes the subject matter of any one of Examples 61-69, and optionally, wherein the traffic comprises Mobile Internet Protocol (MIP) traffic.

Example 71 includes the subject matter of any one of Examples 61-70, and optionally, wherein the method comprises establishing the second path based on at least one parameter selected from the group consisting of a quality of Service (QoS) parameter, a Quality of Experience (QoE) parameter, a power consumption parameter, a link balancing parameter, a link budget parameter, and a billing parameter.

Example 72 includes the subject matter of any one of Examples 61-71, and optionally, wherein the non-cellular link comprises at least one wireless communication link.

Example 73 includes the subject matter of Example 72, and optionally, wherein the wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

Example 74 includes a product including one or more tangible computer-readable non-transitory storage media comprising computer-executable instructions operable to, when executed by at least one computer processor, enable the at least one computer processor to implement a method comprising at a network server, communicating with a first cellular device over a first cellular link; communicating with a second cellular device over a second cellular link; and communicating traffic between the network server and one or more mobile devices, which are connected to the first cellular device, by communicating the traffic via a distributed access path, which is distributed between at least first and second paths, the first path including the first cellular network link, and the second path including the second cellular link.

Example 75 includes the subject matter of Example 74, and optionally, wherein the method comprises distributing between the first and second paths traffic from the network server to the mobile devices.

Example 76 includes the subject matter of Example 75, and optionally, wherein the method comprises distributing the traffic from the network server between the first and second paths based on configuration information from the first cellular device.

Example 77 includes the subject matter of any one of Examples 74-76, and optionally, wherein the method comprises combining traffic received from the mobile devices via the first and second paths.

Example 78 includes the subject matter of any one of Examples 74-77, and optionally, wherein the distributed access path comprises a distributed Internet access path.

Example 79 includes the subject matter of any one of Examples 74-78, and optionally, wherein the traffic comprises Mobile Internet Protocol (MIP) traffic.

Example 80 includes the subject matter of any one of Examples 74-79, and optionally, wherein the method comprises maintaining a signal Mobile Internet Protocol (MIP) connection with the first cellular device via the first and second paths.

Example 81 includes an apparatus of wireless communication, the apparatus comprising means for communicating with one or more mobile devices via a wireless local area network (WLAN) between a first cellular device and the mobile devices; means for communicating with a network server via a cellular network link between the first cellular device and the network server; and mans for tethering between the one or more mobile devices and the network server by communicating traffic between the mobile devices and the network server via a distributed access path including a first path and at least one second path, the first path including the cellular network link, and the second path including a non-cellular link between the first cellular device and a second cellular device.

Example 82 includes the subject matter of Example 81, and optionally, comprising means for distributing between the first and second paths traffic received from the mobile devices via the WLAN.

Example 83 includes the subject matter of Example 81 or 82, and optionally, comprising means for sending to the mobile devices traffic received from the server network via the first and second paths.

Example 84 includes the subject matter of any one of Examples 81-83, and optionally, comprising means for requesting the second cellular device to communicate traffic of the second path via a cellular network link between the second cellular device and the network server.

Example 85 includes the subject matter of any one of Examples 81-84, and optionally, comprising means for requesting the network server to communicate traffic of the second path via a cellular network link between the second cellular device and the network server.

Example 86 includes the subject matter of any one of Examples 81-85, and optionally, comprising means for distributing the traffic between the first and second paths based on at least one parameter selected from the group consisting of a quality of Service (QoS) parameter, a Quality of Experience (QoE) parameter, a power consumption parameter, a link balancing parameter, a link budget parameter, and a billing parameter.

Example 87 includes the subject matter of any one of Examples 81-86, and optionally, comprising means for managing a network layer of the first and second paths.

Example 88 includes the subject matter of any one of Examples 81-87, and optionally, wherein the distributed access path comprises a distributed Internet access path.

Example 89 includes the subject matter of any one of Examples 81-88, and optionally, comprising means for maintaining a single Mobile Internet Protocol (MIP) connection with the network server via the first and second paths.

Example 90 includes the subject matter of any one of Examples 81-89, and optionally, wherein the traffic comprises Mobile Internet Protocol (MIP) traffic.

Example 91 includes the subject matter of any one of Examples 81-90, and optionally, comprising means for establishing the second path based on at least one parameter selected from the group consisting of a quality of Service (QoS) parameter, a Quality of Experience (QoE) parameter, a power consumption parameter, a link balancing parameter, a link budget parameter, and a billing parameter.

Example 92 includes the subject matter of any one of Examples 81-91, and optionally, wherein the non-cellular link comprises at least one wireless communication link.

Example 93 includes the subject matter of Example 92, and optionally, wherein the wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

Example 94 includes an apparatus of wireless communication, the apparatus comprising means for communicating with a first cellular device over a first cellular link between a network server and the first cellular device; means for communicating with a second cellular device over a second cellular link between the network sever and the second cellular device; and means for communicating traffic between the network server and one or more mobile devices, which are connected to the first cellular device, by communicating the traffic via a distributed access path, which is distributed between at least first and second paths, the first path including the first cellular network link, and the second path including the second cellular link.

Example 95 includes the subject matter of Example 94, and optionally, comprising means for distributing between the first and second paths traffic from the network server to the mobile devices.

Example 96 includes the subject matter of Example 95, and optionally, comprising means for distributing the traffic from the network server between the first and second paths based on configuration information from the first cellular device.

Example 97 includes the subject matter of any one of Examples 94-96, and optionally, comprising means for combining traffic received from the mobile devices via the first and second paths.

Example 98 includes the subject matter of any one of Examples 94-97, and optionally, wherein the distributed access path comprises a distributed Internet access path.

Example 99 includes the subject matter of any one of Examples 94-98, and optionally, wherein the traffic comprises Mobile Internet Protocol (MIP) traffic.

Example 100 includes the subject matter of any one of Examples 94-99, and optionally, comprising means for maintaining a signal Mobile Internet Protocol (MIP) connection with the first cellular device via the first and second paths.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a cellular transceiver to communicate between a first cellular device and a network server via a cellular network link; and
    a tethering controller to control at said first cellular device tethering between one or more mobile devices and said network server, via a wireless local area network (WLAN) between said first cellular device and said mobile devices, said tethering controller to manage communication of traffic between said mobile devices and said network server via a distributed access path including a first path and at least one second path, said first path including said cellular network link, and said second path including a non-cellular link between said first cellular device and a second cellular device, said tethering controller configured to determine a distribution setup defining a distribution of the traffic between said first and second paths based on at least one parameter selected from a group consisting of a power consumption parameter relating to a power consumption of said first cellular device, a power state parameter relating to a power state of said first cellular device, and a billing parameter relating to a billing of communication over at least one of said first path or said second path, the distribution setup to define a distribution of different non-zero amounts of traffic over the first and second paths, said tethering controller to cause said first cellular device to transmit to said network server configuration information indicating said distribution setup, and to communicate said traffic via said distributed access path according to said distribution setup.

2. The apparatus of claim 1, wherein said tethering controller is to distribute between said first and second paths traffic received from said mobile devices via said WLAN.

3. The apparatus of claim 1, wherein said tethering controller is to send to said mobile devices traffic received from said server network via said first and second paths.

4. The apparatus of claim 1, wherein said tethering controller is to negotiate said distribution setup with said second cellular device.

5. The apparatus of claim 1, wherein said tethering controller is to request said network server to communicate traffic of said second path via a cellular network link between said second cellular device and said network server.

6. The apparatus of claim 1, wherein said tethering controller is to maintain a single Mobile Internet Protocol (MIP) connection with said network server via said first and second paths.

7. The apparatus of claim 1, wherein said tethering controller is to determine the distribution of the different amounts of traffic over the first and second paths based on at least one parameter selected from a group consisting of a quality of Service (QoS) parameter, and a quality of Experience (QoE) parameter.

8. The apparatus of claim 1, wherein said non-cellular link comprises at least one wireless communication link.

9. The apparatus of claim 8, wherein said wireless communication link comprises at least one link selected from the group consisting of a Wireless-Fidelity (Wi-Fi) link, a Wi-Fi Direct (WFD) link, a Bluetooth (BT) link, a Bluetooth Low Energy (BLE) link, a Point-to-Point (P2P) link, and a Tunneled Direct Link Setup (TDLS) link.

10. The apparatus of claim 1 including:
    at least one antenna;
    a memory;
    a processor; and
    a WLAN transceiver to communicate with said mobile devices via said WLAN.

11. An apparatus comprising:
    a memory;
    a processor; and
    a communication controller to control at a network server communication of traffic between said network server and one or more mobile devices via a distributed access path, which is distributed between at least first and second paths, said first path including a first cellular network link between said network server and a first cellular device, and said second path including a second cellular link between said network server and a second cellular device, said communication controller to process configuration information from said first cellular device, said configuration information indicating a distribution setup determined by said first cellular device, said distribution setup defining a distribution of the traffic between said first and second paths based on at least one parameter selected from a group consisting of a power consumption parameter relating to a power consumption of said first cellular device, a power state parameter relating to a power state of said first cellular device, and a billing parameter relating to a billing of communication over at least one of said first path or said second path, the distribution setup to define a distribution of different non-zero amounts of traffic over the first and second paths, said communication controller to cause said network server to communicate said traffic via said distributed access path according to said distribution setup.

12. The apparatus of claim 11, wherein said communication controller is to distribute between said first and second paths traffic from said network server to said mobile devices.

13. The apparatus of claim 12, wherein said communication controller is to distribute downlink traffic from said network server between said first and second paths according to said distribution setup.

14. The apparatus of claim 11, wherein said communication controller is to combine traffic received from said mobile devices via said first and second paths.

15. The apparatus of claim 11, wherein said communication controller is to maintain a single Mobile Internet Protocol (MIP) connection with said first cellular device via said first and second paths.

16. The apparatus of claim 11 comprising:
    a cellular transceiver to communicate with said first cellular device via said first cellular network link, and to communicate with said second device via said second cellular network link.

17. A product including one or more tangible computer-readable non-transitory storage media comprising computer-executable instructions operable to, when executed by at least one computer processor, enable the at least one computer processor to implement operations comprising:
    at a first cellular device, communicating with one or more mobile devices via a wireless local area network (WLAN) between said first cellular device and said mobile devices;
    communicating between said first cellular device and a network server via a cellular network link between said first cellular device and a network server; and
    tethering between the one or more mobile devices and said network server by communicating traffic between said mobile devices and said network server via a distributed access path including a first path and at least one second path, said first path including said cellular network link, and said second path including a non-cellular link between said first cellular device and a second cellular device, said tethering comprises determining a distribution setup defining a distribution of the traffic between said first and second paths based on at least one parameter selected from a group consisting of a power consumption parameter relating to a power consumption of said first cellular device, a power state parameter relating to a power state of said first cellular device, and a billing parameter relating to a billing of communication over at least one of said first path or said second path, the distribution setup defining a distribution of different non-zero amounts of traffic over the first and second paths, said tethering comprises transmitting from said first cellular device to said network server configuration information indicating said distribution setup, and communicating said traffic via said distributed access path according to said distribution setup.

18. The product of claim 17, wherein the operations comprise distributing between said first and second paths traffic received from said mobile devices via said WLAN.

19. The product of claim 17, wherein the operations comprise sending to said mobile devices traffic received from said server network via said first and second paths.

20. The product of claim 17, wherein the operations comprise negotiating said distribution setup with said second cellular device.

21. A product including one or more tangible computer-readable non-transitory storage media comprising computer-executable instructions operable to, when executed by at least one computer processor, enable the at least one computer processor to implement operations comprising:
   at a network server, communicating with a first cellular device over a first cellular link;
   communicating with a second cellular device over a second cellular link;
   processing configuration information from said first cellular device, said configuration information indicating a distribution setup determined by said first cellular device, said distribution setup defining a distribution of traffic between at least first and second paths based on at least one parameter selected from a group consisting of a power consumption parameter relating to a power consumption of said first cellular device, a power state parameter relating to a power state of said first cellular device, and a billing parameter relating to a billing of communication over at least one of said first path or said second path, the distribution setup defining a distribution of different non-zero amounts of traffic over the first and second paths; and
   communicating the traffic between said network server and one or more mobile devices, which are connected to said first cellular device, by communicating said traffic via a distributed access path, which is distributed between the at least first and second paths, said first path including said first cellular network link, and said second path including said second cellular link.

22. The product of claim 21, wherein the operations comprise distributing between said first and second paths traffic from said network server to said mobile devices.

23. The product of claim 21, wherein the operations comprise combining traffic received from said mobile devices via said first and second paths.

* * * * *